United States Patent [19]

Hsieh et al.

[11] Patent Number: 5,362,505
[45] Date of Patent: Nov. 8, 1994

[54] COATING UNBLANCHED, RAW NUTS

[75] Inventors: Yen C. Hsieh, Cincinnati, Ohio; Anthony P. Richards, Gary, Ind.; Jose Alvarado, Chicago, Ill.; Benito Romanach, West Chester, Ohio

[73] Assignee: The Procter & Gamble Company, Cincinnati, Ohio

[21] Appl. No.: 131,810

[22] Filed: Oct. 5, 1993

Related U.S. Application Data

[63] Continuation-in-part of Ser. No. 973,400, Nov. 10, 1992, abandoned.

[51] Int. Cl.$^5$ .................. A23G 3/00; A23L 1/36; A23L 1/052
[52] U.S. Cl. .................. 426/93; 426/103; 426/303; 426/309; 426/575; 426/576; 426/577; 426/578; 426/658; 426/660; 426/661
[58] Field of Search .............. 426/93, 303, 309, 103, 426/578, 575, 576, 577, 661, 658, 660

[56] References Cited

U.S. PATENT DOCUMENTS

| | | | |
|---|---|---|---|
| 2,824,009 | 2/1958 | Lindow | 426/103 |
| 3,167,035 | 1/1965 | Benson | 426/309 |
| 4,053,650 | 10/1977 | Chino et al. | 426/304 |
| 4,499,113 | 2/1985 | Mochizuki et al. | 426/103 |
| 4,522,833 | 6/1985 | Sharma | 426/93 |
| 4,692,342 | 9/1987 | Gannis et al. | 426/293 |
| 4,769,248 | 9/1988 | Wilkins et al. | 426/291 |
| 4,822,625 | 4/1989 | Gannis | 426/93 |

FOREIGN PATENT DOCUMENTS

WO83/00278 2/1983 WIPO ............. A23L 1/36

Primary Examiner—Helen Pratt
Attorney, Agent, or Firm—William J. Winter; Rose Ann Dabek

[57] ABSTRACT

Disclosed is a method for producing individual, crunch-confectionery-coated edible nuts. The raw, unblanched nuts are first coated with a film-forming polysaccharide to maintain the skins adhered to the nuts in a durable polysaccharide coating. The coated nuts are then subjected to shear mixing, e.g., in a pan coater, during which sucrose syrup is applied to the polysaccharide-coated nuts. Heat is applied to the nuts during shear mixing to remove moisture and to thereby form a crystalline coating, which is then partially melted to form a crystalline-amorphous coating on top of the polysaccharide coating on the individual nuts.

9 Claims, No Drawings

COATING UNBLANCHED, RAW NUTS

This is a continuation-in-part of copending application Ser. No. 07/973,400, abandoned, filed on Nov. 10, 1992.

TECHNICAL FIELD

This invention is directed to a method for producing individual crunch-confectionery-coated edible nuts wherein the coating contains a substantially continuous, crystalline sucrose phase intermeshed with a substantially continuous, amorphous sucrose phase.

BACKGROUND OF THE INVENTION

One goal of the main embodiment of the present invention is to obtain the benefit of the nut skins in the ultimate product, namely contribution to product color and taste (flavor) and better adherence of confectionery coating. Application of confectionery coating to certain types of unblanched, raw nuts in any device which imparts mixing action, especially in a pan coater or the like, normally removes a significant amount of nut skins so that they cannot provide the desired advantages.

An important goal of the present invention is to obtain a proper texture in the ultimate product, i.e., a crunchy coating of desired thickness and uniformity while minimizing the formation of small hard candy pieces. In one process of which the inventors are aware, a small copper or stainless steel fixed kettle is used with a gas burner below, and the nuts are stirred within the kettle by a plow (generally brass) attached to a vertical rotating shaft, and syrup is added in successive additions while heat is applied to build up successive layers on the surface of the nut. There are several deficiencies to this fixed kettle approach. Firstly, batch sizes are required to be small and therefore processing is expensive (labor intensive). Secondly, the process is very sensitive to heat control since the plow can only provide a small amount of agitation and sheering action. Thirdly, there is a significant tendency to generate small, hard candy pieces. Fourthly, a high percentage of product contains bald spots, i.e., areas which are uncoated.

SUMMARY OF THE INVENTION

The method of the present invention maximizes nut skin retention and the benefits flowing therefrom and ameliorates the deficiencies associated with the fixed kettle (rotating mixer shaft device) process describe above. The method comprises the steps of:

a. applying a film-forming polysaccharide to unblanched, raw, edible nuts to provide from about 0.1% to about 5% of a polysaccharide coating thereon by weight of the nuts to thereby maintain the skins adhered to the nuts;

b. providing shear mixing to the polysaccharide-coated nuts in a rotating coating device, and during the shear mixing
   i. applying to the polysaccharide-coated nuts a sucrose syrup which has a temperature of from about 120° to about 240° F. and which contains from about 50% to about 85% sucrose and from about 15% to about 50% water;
   ii. heating the interior wall of the rotating coating device to a temperature of from about 300° to about 400° F. for a time sufficient to remove moisture from the applied sucrose syrup to form a crystalline sucrose coating on top of the polysaccharide coating on the nuts, and
   iii. allowing the interior wall temperature in step (b)(ii) to rise to between about 350° and about 400° F. for a time sufficient to melt from about 5% to about 50% of the crystalline sucrose coating; and then c. cooling the coated nuts to a temperature of below about 120° to form individual crunch-confectionery-coated nuts, wherein the sucrose coating on the individual nuts comprises from about 5% to about 50% amorphous sucrose and from about 50% to about 95% crystalline sucrose.

DETAILED DESCRIPTION OF THE INVENTION

The method of the present invention involves two key steps. In a first step, the unblanched, raw edible nuts are coated with a film-forming polysaccharide to adhere the nut skins to the nuts. In a second subsequent step, the nuts are provided with a crystalline-amorphous sucrose coating on top of the polysaccharide coating.

The terms used herein are defined as follows:

"Crunch" is a relatively loud sound result from the initial biting and subsequent masticating of the crystalline and amorphous sucrose coating that envelopes a nut.

"Completely coated" means that less than 8% of the coated nuts contain bald (i.e., uncoated) spots.

"Amorphous sucrose" is the unorganized molecular arrangement obtained on solidifying of melted crystalline sucrose.

"Shear mixing" is mixing such that adjacent nuts travel at different tangential velocities such that smearing and polishing action occurs at nut surfaces.

"Rotating coating device" means a rotating container or a stationary container with a screw conveyance or agitation means therein.

"Raw nuts" are unroasted nuts.

"Unblanched nuts" are nuts with skins attached.

All percentages and ratios are based on weight unless otherwise specified.

The method of the present invention is described in detail as follows.

Film-Forming Polysaccharide Coating

In the first step (polysaccharide coating step) of the method herein, a film-forming polysaccharide is applied to unblanched, raw edible nuts. The film-forming polysaccharide forms a coating around the nuts thereby adhering the nut skins to the nuts.

The unblanched, raw edible nuts are any unroasted edible nuts with shells removed but skins attached. Examples include almonds, Brazil nuts, filberts, peanuts, pecans, and walnuts. Preferably, the nuts are those with normally loose skins such as Brazil nuts, filberts, peanuts and walnuts. Peanuts are most preferred since the skins provide a very positive contribution to color and taste.

Suitable film-forming polysaccharides include film-forming starches, cellulose derivatives, pectin, agar, carrageenan and natural gums such as gum arabic, tragacanth gum, guar gum, karaya gum and locust-bean gum.

Preferably, the film-forming polysaccharide is a film-forming starch. These film-forming starches are usually pregelatinized and/or modified Suitable film-forming starches include pregelatinized and or modified waxy maize starch, pregelatinized and/or modified waxy rice starch, pregelatinized and/or modified potato starch and pregelatinized and/or modified tapioca starch.

The film-forming polysaccharides are preferably applied to the unblanched nuts in an aqueous solution. The aqueous solution contains from about 0.5% to about 30%, preferably from about 5% to about 15%, by weight of the film-forming polysaccharide. The aqueous solution is applied to the nuts to obtain a final polysaccharide coating on the nuts of from about 0.1% to about 5%, preferably from about 0.1% to about 2%, by weight of the nuts.

The film-forming polysaccharide can be applied to the unblanched nuts by any known or conventional, batch or continuous, coating operation. Suitable means include 1) ladling, spraying or bulk pumping the film-forming polysaccharide onto the nuts in a rotating vertical shaft mixer fixed kettle device, 2) using a rotating coating device (e.g., a pan coater or rotating drum continuous coater), 3) using dipping operations (e.g., using an enrobing machine or other dipping apparatus), or 4) positioning the nuts on a continuous belt and applying the film-forming polysaccharide to the nuts as a falling curtain or waterfall. When the film-forming polysaccharide is applied by ladling or spraying into the revolving pan of a conventional pan coater, the rotation of the pan will typically be from about 12 to about 20 RPM. As described hereinafter, lower RPMs are desirable if the application is in a continuous rotating drum coater where the sucrose coating step, also described hereinafter, is performed downstream in the same coater.

Preferably, the film-forming polysaccharide is applied when the temperature of both the nuts and the wall of the coating apparatus are below about 150° F. At these temperatures, the film-forming polysaccharide most effectively coats the unblanched nuts. Above 150° F., the skins on some types of nuts have a tendency to detach.

The film-forming polysaccharide is applied to the nuts until a uniform polysaccharide coating is obtained as indicated by a wet surface appearance. Application times vary with the coating apparatus, the bed depth and the agitation speed in a fixed kettle device or the rotation speed in a pan coater. A suitable application time in a pan coater can range, for example, from about 1 to about 15 minutes.

The polysaccharide-coated nuts can be allowed to dry (e.g., air dry or forced heat) for a short period before being subjected to the sucrose coating step described hereinafter. This enables the polysaccharide coating to set up more and can result in slightly better skin retention during the subsequent sucrose coating step. However, drying to the point of microbiological stability is undesirable, as at this dryness, the skins detach more readily. If a drying period is utilized, it can be carried out in a batch system by maintaining the polysaccharide-coated nuts at ambient temperatures for between about 5 and about 20 minutes. It can also be carried out in a continuous operation, e.g., when polysaccharide application is carried out in a pan coater, by leaving the polysaccharide-coated nuts in the pan coater for between about 5 and about 20 minutes.

The film-forming polysaccharide provides a durable coating around the individual nuts. This durable coating encases and therefore adheres the nut skins to or around the individual nuts. These encased nut skins are then able to withstand shear mixing and remain adhered to the nuts during the sucrose coating step described hereinafter.

Sucrose Coating Step

In the second step (sucrose coating step) of the method herein, the polysaccharide-coated nuts are subjected to shear mixing in a rotating coating device while being coated with a sucrose syrup. During the shear mixing, a crystalline sucrose forms on the polysaccharide-coated nuts and is then partially melted to form a crystalline-amorphous sucrose coating on the nuts. The sucrose coating step can be a batch or continuous operation.

The sucrose syrup can be prepared by known and conventional means and comprises from about 50% to about 85% sucrose and from about 15% to about 50% water, preferably from about 65% to about 85% sucrose and from about 15% to about 35% water. The sucrose syrup can further comprise up to about 10% flavoring (e.g., from about 0.01% to about 3.0% vanilla) or other components which contribute to flavor (e.g., from about 0.5% to about 5% salt), the flavoring and other components being such as not to impact upon the crystallization characteristics of the sucrose. Reducing sugar containing ingredients such as corn syrup should be minimized as they inhibit sucrose crystallization.

The temperature of the sucrose syrup when applied to the polysaccharide-coated nuts must be from about ambient to about 240° F. The temperature is preferably from about 120° to about 240° F. as this more readily retains sucrose in solution and reduces residence time in the rotating coating device during the sucrose coating step The total amount of sucrose applied to the polysaccharide-coated nuts is typically, on a dry basis, from about 20% to about 80%, preferably from about 30% to about 60%, by weight of the coated nuts.

An important aspect of the sucrose coating step is the temperature of the interior wall of the rotating coating device during shear mixing. This temperature is maintained within a range of between about 300° and 400° F. to remove moisture from the sucrose syrup to form a crystalline sucrose coating around the individual polysaccharide-coated nuts. During shear mixing, the interior wall temperature must also exceed about 350° F. (i.e., exceeding the melting point of crystalline sucrose), preferably between about 350° and 400° F., long enough to melt and therefore convert from about 5% to about 50% of the just-formed crystalline sucrose to amorphous sucrose. The resulting amorphouscrystalline sucrose coating surrounds the individual polysaccharide-coated nuts and comprises from about 50% to 95% crystalline sucrose and from about 5% to about 50% amorphous sucrose, preferably from about 60% to about 90% crystalline sucrose and from about 10% to about 40% amorphous sucrose. As more crystalline sucrose is converted to amorphous form, the sucrose coating becomes harder, it looses its whitish-crystalline appearance, and more flavor (via browning reactions) develops. Failure to convert the requisite amount of sucrose to amorphous form will result in an undesirably grainy texture and appearance to the sucrose coating. The grainy texture is not durable and is easily broken away from the individual nuts during coating and packaging processes.

Subjecting the sucrose coating to temperatures above 350° F. also acts to develop flavor. These higher temperatures promote browning reactions within the sucrose which develops caramel flavors. It also promotes the development of flavor within the nut skins as well as the leaching of pigment from the skins into the sucrose coating.

The crystalline-amorphous sucrose coating formed by the method herein exhibits improved texture characteristics. This coating is durable and crunchy but not excessively hard or brittle. It is believed that this improved texture comes primarily from a substantially continuous network of sucrose crystals supported by and intermeshed with a substantially continuous, amorphous sucrose system. It is believed that the two substantially continuous systems are intermeshed, e.g., they are not in separate layers or in separate discrete regions lo of the sucrose coating. During the conversion of crystalline to amorphous sucrose in the sucrose coating step, the amorphous sucrose displaces some but not all of the air spaces within the just-formed crystalline network. Excessive conversion to amorphous sucrose will eliminate these air spaces (amorphous sucrose system displaces the air spaces) making the sucrose coating undesirably hard. Insufficient conversion to amorphous sucrose, however, will render the sucrose coating grainy and fragile due in part to excessive air spaces within the intermeshed crystalline-amorphous system.

The polysaccharide-coated nuts are preferably preheated to a temperature ranging from about 140° F. to about 260° F. prior to sucrose syrup addition. If preheating of the nuts is utilized, it is preferably carried out slowly, e.g., over 10 to 60 minutes in a nut roaster, to dry the nuts to an appropriate moisture content (e.g., about 5% or less), as heating at a faster rate can cause loosening of the skins, even with the film-forming polysaccharide coating encasing the skins, due to rapid moisture release because of local overheating, or by evenly distributing the heat throughout the nut by infrared or microwave heating to obtain an appropriate moisture content.

Preferably, the sucrose coating step comprises a plurality of sucrose coating steps, more preferably at least about 4 sucrose coating steps, most preferably at least about 8 sucrose coating steps. The plurality of steps are o performed sequentially. The maximum number of sucrose coating steps will typically be about 30, more typically between about 10 and 20, although many more sucrose coating steps can be used (e.g., in continuous sucrose coating operations). To achieve a certain final amount of sucrose coating (e.g., 1/32 inch), coating texture will improve (e.g., crunchiness, reduced grainy texture, durability without excessive hardness) with each repetition of the sucrose coating step up to about 8 such repetitions. Increased repetitions of the sucrose coating step to achieve a given amount of sucrose coating will not, however, reduce process times. At the end of each successive sucrose coating application, the polysaccharide-coated nuts also contain from about 50% to about 95% crystalline sucrose and from about 5% to about 50% amorphous sucrose.

Preferably, from about 1% to about 20% of the sucrose (dry basis by weight of the coated nuts) is applied during each optimal repetition of the sucrose coating step. Each repetition involves the introduction of the sucrose syrup into the rotating coating device with polysaccharide-coated nuts tumbling therein and heating the interior wall of the rotating coating device to the requisite temperatures to drive off moisture to convert the sucrose syrup to crystalline sucrose and to convert some of the just-formed crystalline sucrose to amorphous form.

During the sucrose coating step, the shear mixing can be carried out in a rotating coating device such as a revolving pan equipped with ribs or baffles, for axial rotation, with heating being supplied to the container wall by a series of gas burners in parallel or circular array adjacent the outside of the revolving pan of the rotating coating device. A very suitable device is a revolving pan known in the candy making art as a pan coater, equipped with gas burner heating means. Rotation in the rotating coating device is typically between about 10 and 30 RPM, more typically between 15 and 20 RPM. The device can be equipped with an insulated shroud to minimize heat loss. If a pan coater equipped with gas flame heating is used in the sucrose coating step, the same device can first be used in the polysaccharide coating step with the heating means turned down or off. The polysaccharide-coated nuts within the pan coater are then immediately subjected to the sucrose coating step while remaining within the same pan coater.

The sucrose syrup can be introduced into the rotating coating device by a ladle or an automatic or manually activated spray head or faucet within the device. Typically, each addition of sucrose syrup into the rotating coating device is carried out very quickly, e.g., over about 2 to about 30 seconds.

Heat is preferably applied to the rotating coating device by application of gas burners continuously. After an initial heat up period, the temperature of the interior wall of the rotating coating device (i.e., the bottom temperature adjacent the burners) is maintained between about 300° and about 400° F. Typically, the temperature of the nuts, as measured by infrared temperature sensor, increases from the initial temperature on introduction into the batch process of the sucrose coating step up to about 280° F., with temporary drops in temperature occurring, as each optional repetition of the sucrose coating step is initiated on addition of the sucrose syrup.

In each optional repetition of the sucrose coating step, moisture is driven off from the sucrose syrup so that crystalline sucrose is formed (having a white appearance) and then some of the just-formed crystalline sucrose is subsequently melted to convert into amorphous form (this melting causes darkening of the surface via browning reactions and reduction of light scattering). To melt the crystalline sucrose, the temperature of the interior wall of the rotating coating device (i.e., the bottom temperature adjacent the burners) must be above 350° F., preferably between about 350° and about 400° F., at some time during the sucrose coating step. It is the contact between the just-formed crystalline sucrose coating and the hot interior wall of the coating device which causes the desired melting of crystalline sucrose to convert it to amorphous form. The crystalline sucrose coating is typically subjected to the melting temperatures toward the end of the sucrose coating step. After the requisite degree of melting occurs, the sucrose coating step can be repeated if desired.

The end point of the sucrose coating step can readily be determined by visual inspection by noting first the whitish appearance associated with forming crystalline sucrose and then watching for the appropriate amount of darkening and glossiness to occur as determined empirically corresponding to the desired amount of conversion of crystalline sucrose to amorphous form. This may also be determined by more objective means such as temperature or colorimetry.

Each sucrose coating step is typically carried out over 10 to 15 minutes. Longer or shorter times may be necessary depending on the amount of sucrose added per each sucrose coating step.

The number of sucrose coating steps should be sufficient to obtain the desired coating thickness (normally 1/32 to ⅛ inches) while minimizing the formation of small hard confectionery pieces (rather than a coating on the nuts) and sufficient to obtain the textural hardness corresponding to the amount of crunch desired. Too few sucrose coating steps for a particular coating thickness can result in undesirable formation of small hard confectionery pieces.

After the sucrose coating step(s), the crystalline-amorphous coated nuts can be further coated with corn syrup and or melted butter or margarine. Specifically, from about 0.5% to about 8% of corn syrup, (e.g., 42 DE corn syrup) on a dry basis by weight of the final coating, can be added to the crystalline-amorphous coated nuts to impart more gloss. From about 1% to about 12% by weight of melted butter or margarine, on a final coating basis, can be also be added to impart a buttery flavor.

The sucrose coating step can be carded out as a continuous operation. The polysaccharide-coated nuts can be conveyed along a processing path, e.g., in a rotating drum, while providing shear mixing thereto and introducing sucrose syrup along the processing path continuously or discontinuously (e.g., successive additions in small increments along the processing path) while also providing the requisite temperatures to ultimately form the amorphous-crystalline sucrose coating as described hereinbefore.

After the sucrose coating step, the amorphous-crystalline coated nuts are cooled to below about 120° F. This is typically done by discharging the amorphous-crystalline coated nuts from the heated coating device immediately after the sucrose coating step to minimize further conversion of crystalline sucrose to amorphous sucrose. Cooling can be achieved, for example, by forced air cooling on a cooling table or conveyer.

The amount of crunch in the resulting coated nut product varies directly with the ratio of crystalline to amorphous sugar, the amount and density of the amorphous-crystalline coating, the extent that the amorphous and crystalline systems are developed and intermeshed, and the number of crystalline-amorphous sucrose layers. The amount of crunch is also impacted by final product moisture content which may be readily adjusted by drying or moisture application. Lower moisture content (1-3%) gives more crunch than a higher moisture content (>3 to 5%).

The result is individual nuts each coated with a crunch coating of crystalline and amorphous sugar. When peanuts are utilized, the skins contribute a red hue to the coating by the leaching of some of the pigment from the skins into the syrup during coating and by providing a reddish/brown background under the confectionery coating and also a woody and somewhat bitter characteristic flavor. Furthermore, the skins help provide a base on which the polysaccharide coating and the crystalline-amorphous sucrose coating better adhere than the oily surface of a blanched nut (especially during heating). The method herein provides the advantages of less labor requirements, less sensitivity to heat control, less tendency to generate hard candy pieces and more complete coating compared to what is obtained in the fixed kettle approach.

In the instant method, no preroasting is carried out on the confectionery coated nuts; however, as indicated above, some amount of preheating of the nuts can be carried out to reduce the time in the sucrose coating step. The raw nuts used in the instant method are ultimately roasted during the application of heat in the sucrose coating step(s).

The invention is illustrated by the following examples.

EXAMPLE I

Polysaccharide Coating Step

About 100 lbs. of unblanched, raw, edible peanuts (100 lbs.) are coated with 0.15% film-forming polysaccharide (pregelatinized modified waxy maize starch) by weight of the nuts. This is carried out by adding the nuts to a pan coater equipped with ribbings and a gas burner (turned off), applying one-half of the film-forming polysaccharide to the nuts in the pan coater by spraying an aqueous solution containing 10% pregelatinized modified waxy maize starch onto the nuts, rotating the pan one turn, and then applying the remainder of the film-forming polysaccharide solution to the nuts in the same manner. The pan coater is then rotated at 18 RPM for 10 minutes to distribute the film-forming polysaccharide solution over the peanuts to thereby adhere the nut skins to the individual nuts.

Sucrose Coating Step

Rotation of the pan coater is continued at 18 RPM to provide shear mixing to the polysaccharide coated nuts therein. The gas burner is turned on. After about 40 minutes, the temperature of the interior pan wall ranges from 320° F. to 395° F. throughout the sucrose coating step. About 25 minutes after the gas burner is turned on, about 6 lbs. of a sucrose syrup (temperature 140° F. to 150° F.) is applied to the nuts during shear mixing. Nut temperatures are about 135° F. (as hereinafter measured by infrared temperature sensor) just prior to the sucrose syrup addition. The sucrose syrup contains 3.0 parts sucrose, 1.2 parts water and 0.0002 parts of added vanilla powder. As moisture is driven off from the applied sucrose syrup to form a crystalline sucrose coating around the individual nuts, the interior pan wall temperature gradually rises to between 350° F. and 395° F. at which point the crystalline sucrose begins to melt and form amorphous sucrose. This sucrose coating step ends when visual observation indicates that a crystalline sucrose coating has formed around the individual nuts and that about 10% to 40% of the just-formed crystalline sucrose has converted to amorphous form.

The sucrose coating step is then repeated nine additional times in the same manner except that no initial 40 minute heating up period is needed. In the tenth sucrose coating step, the melting of the formed crystalline sucrose is allowed to continue until about 20% of it is converted to amorphous form. The ten steps take about 125 minutes to complete. After the tenth step, the gas burner is turned off, and 1 lb. of salt, then 2 lbs. of 42 DE (Dextrose Equivalent) corn syrup and then 5 lbs. of melted butter are added to the coated nuts. Rotation of the pan coater is then stopped. The product is removed from the pan coater and cooled by forced air for 10 minutes to below 85° F. The sucrose coating on top of the polysaccharide coating on the individual nuts contains about 20% amorphous sucrose and about 80% crystalline sucrose.

EXAMPLE II

Example I is repeated except that the same total amount of sucrose syrup is applied over 19 sucrose coating steps instead of 10. Nut temperatures oscillates around 250° F. but to a lesser degree than in Example I.

EXAMPLE III

Example I is repeated except that the sucrose syrup added into each sucrose coating step is at 190° F. and the polysaccharide coated nuts are preheated to 260° F. before being contacted with sucrose syrup solution. Again nut temperatures oscillate around 250° F. The ten sucrose coating steps are completed at about 80 minutes.

EXAMPLE IV

Confectionery coated nuts are produced as in Example I except that an equal weight of walnuts or filberts or Brazil nuts is substituted for the peanuts.

Many variations of inventive embodiments will be obvious to those skilled in the art. Thus, inventive embodiment are defined by the claims.

What is claimed is:

1. A method for producing individual, crunch-confectionery-coated edible nuts, which method comprises the steps of:
   a. applying a film-forming polysaccharide to unblanched, raw, edible nuts to provide from about 0.1% to about 5% of a polysaccharide coating thereon by weight of the nuts to thereby maintain the skins adhered to the nuts;
   b. providing shear mixing to the polysaccharide-coated nuts in a rotating coating device, and during the shear mixing
      i. applying to the polysaccharide-coated nuts a sucrose syrup which has a temperature of from about 120° to about 240° F. and which contains from about 50% to about 85% sucrose and from about 15% to about 50% water;
      ii. heating the interior wall of the rotating coating device to a temperature of from about 300° to about 400° F. for a time sufficient to remove moisture from the applied sucrose syrup to form a crystalline sucrose coating on top of the polysaccharide coating on the nuts; and
      iii. allowing the wall temperature in step (b)(ii) To rise to between about 350° F. and about 400° F. for a time sufficient to melt from about 5% to about 50% of the crystalline sucrose coating; and then
   c. cooling the coated nuts to a temperature of below about 120° to
      form individual crunch-confectionery coated edible nuts, wherein the sucrose coating on the individual nuts comprises from about 5% to about 50% amorphous sucrose and from about 50% to about 95% crystalline sucrose.

2. The method of claim 1 wherein the unblanched, raw, edible nuts are unblanched, raw peanuts.

3. The method of claim 2 wherein the polysaccharide coated nuts from step 1(*a*) are subjected to step 1(*b*) a plurality of times.

4. The method of claim 3 wherein step 1(*b*) is repeated at least about 8 times.

5. The method of claim 3 further comprising the step of admixing with the nuts, after all repetitions of step 1(*b*), from about 0.5% to about 8% by weight of corn syrup on a dry basis by weight of the final coating on the nuts followed by admixing with the nuts from about 1% to about 12% melted butter by weight of the final coating on the nuts.

6. The method of claim 3 wherein the polysaccharide coating is from about 0.1% to about 2% by weight of the nuts.

7. The method of claim 3 wherein the polysaccharide-coated nuts are introduced into step 1(*b*) having a temperature of from about 140° to about 260° F.

8. The method of claim 3 wherein the sucrose syrup contains from about 65% to about 85% sucrose and from about 15% to about 35% water.

9. The method of claim 3 wherein the resulting sucrose coating on the individual nuts comprises from about 10% to about 40% amorphous sucrose and from about 60% to about 90% crystalline sucrose.

* * * * *